US011959566B2

(12) United States Patent
Tobler et al.

(10) Patent No.: US 11,959,566 B2
(45) Date of Patent: Apr. 16, 2024

(54) CLAMP WITH DEPRESSIONS IN AN INSERT

(71) Applicant: Oetiker Schweiz AG, Horgen (CH)

(72) Inventors: Dominik Tobler, Horgen (CH); Steffen Richter, Horgen (CH)

(73) Assignee: Oetiker Schweiz AG, Horgen (CH)

( * ) Notice: Subject to any disclaimer, the term of this patent is extended or adjusted under 35 U.S.C. 154(b) by 92 days.

(21) Appl. No.: 17/772,523

(22) PCT Filed: Oct. 30, 2019

(86) PCT No.: PCT/EP2019/079745
§ 371 (c)(1),
(2) Date: Apr. 28, 2022

(87) PCT Pub. No.: WO2021/083519
PCT Pub. Date: May 6, 2021

(65) Prior Publication Data
US 2022/0403960 A1 Dec. 22, 2022

(51) Int. Cl.
*F16L 21/06* (2006.01)
*F16L 33/04* (2006.01)

(52) U.S. Cl.
CPC ............. *F16L 21/065* (2013.01); *F16L 33/04* (2013.01); *F16L 2201/20* (2013.01)

(58) Field of Classification Search
CPC ...... F16L 21/065; F16L 2201/20; F16L 33/04
See application file for complete search history.

(56) References Cited

U.S. PATENT DOCUMENTS

| RE33,639 E | * | 7/1991 | Oetiker | F16L 33/025 24/20 R |
|---|---|---|---|---|
| 9,103,476 B2 | * | 8/2015 | Geese | F16L 21/065 |
| 11,255,473 B2 | * | 2/2022 | Mitchell | F16B 2/08 |
| 2020/0277986 A1 | * | 9/2020 | Ignaczak | F16C 19/04 |

FOREIGN PATENT DOCUMENTS

EP 2669562 A2 * 12/2013 ............. F16L 33/06

* cited by examiner

*Primary Examiner* — James M Hewitt, II
(74) *Attorney, Agent, or Firm* — David L. Nocilly; Bond Schoeneck & King PLLC

(57) ABSTRACT

A tensioning clamp (10) with a tensioning band (12), two tensioning elements (14a, 14b), a pulling element (16) and an insert (18). The tensioning band (12) comprises two ends folded over to form a loop. Each of the loops (20a, 20b) receives a tensioning element and has openings (24, 26). The pulling element (16) connects the tensioning elements (14a, 14b) through the openings (24, 26) and transmits a pulling force applied to tension the tensioning clamp (10). The insert (18) is arranged in a circumferential region of the loops (20a, 20b) between the tensioning band (12) and a binding material, and has two radially inwardly projecting ribs (30a, 30b) extending in the circumferential direction of the tensioning band (10) and a trough (32) formed between the ribs (30a, 30b). A rear side of the insert (18) facing the tensioning belt (12) in the region of the trough (32) forms a support surface (34) The support surface (34) has at least one recess (40a, 40b) in a circumferential region lying below the tensioning elements (14a, 14b).

6 Claims, 3 Drawing Sheets

CLAMP WITH DEPRESSIONS IN AN INSERT

The invention relates to a clamp according to the generic concept of claim 1.

Clamps or hose clamps of the type described are used for fastening hoses or other goods to be tied to pipes or for connecting pipes.

The document EP 2754 940 B1 discloses clamp with a tensioning band, two tensioning elements and a tensioning screw. In EP 2754 940 B1, an inner ring is composed of an upper and a lower half. The tensioning screw connects the tensioning elements through the openings of the loops and transmits a tensile force applied to tension the clamp, thus pulling the tensioning elements towards each other so that the circumference of the tensioning clamp is reduced, and a radially acting contact force is exerted on the material to be clamped.

The insert of the tensioning clamp is arranged in a circumferential area of the loops between the tensioning band and the lashing material and has a W-shaped profile. The tensioning elements rest on the insert above the lower leg of the tensioning band. When the tensioning screw is tightened, a contact pressure is generated which is, however, unevenly distributed over the circumference of the tensioning band. The forces are concentrated in narrow areas below the clamping elements. On the one hand, this can lead to insufficient contact forces in other areas and consequently to sealing problems and, on the other hand, to damage to the liner in areas subject to the concentration of force.

Other clamps of the same type are known from EP 2 669 562 A2 and DE 198 22 915 C2. Inserts or inner rings for tension clamps of other types are known, for example, from WO 2013/013149 A1, EP 1 912 007 B1 and U.S. Pat. No. 5,630,255 A.

The invention is based on the problem of providing a clamp of the type described, which produces a more homogeneous distribution of the contact forces on the material to be clamped.

The problem is solved by a clamp with the features of claim 1. Advantageous embodiments of the invention result from the sub-claims.

The invention relates to a tensioning clamp with a tensioning band, two tensioning elements, a pulling element and an insert, wherein the tensioning band comprises two ends which are each folded over to form a loop, wherein each of the loops receives a tensioning element and has openings. The pulling element connects the tensioning elements through the openings of the loops and transmits a tensile force applied to tension the tensioning clamp, thus pulling the tensioning elements towards each other so that the circumference of the tensioning clamp is reduced and a radially acting contact force is exerted on the material to be clamped.

The insert of the tensioning clamp is arranged in a circumferential area of the loops between the tensioning band and the material to be clamped. The length of the insert can be somewhat smaller than the length of the loops, but in any case it covers the circumferential area occupied by the tensioning elements and the space between the tensioning elements.

The insert has a profile with at least two ribs running in the circumferential direction of the tensioning clamp and projecting radially inwards and a depression formed between the ribs, i.e. a W-profile. The rear side of the depression facing the tensioning band forms a support surface for the material to be clamped. Embodiments of the invention are also conceivable in which further, lateral support surfaces are provided laterally next to the ribs or between the ribs and walls projecting radially at both axial edges to receive the tensioning band, or in which more than three ribs are provided, each separated from the others by a recess.

The insert can be formed in particular from a spring-elastic flat material, for example sheet steel. The spring action of the W-profile ensures high tightness over a very wide temperature range.

It is proposed that the contact surface has at least one depression in a circumferential region lying below the tensioning elements. In the area of the depression, the contact force of the clamping band is at least reduced compared to inserts without depressions, and depending on the depth, it is also eliminated altogether, at least up to a predefined clamping force. The latter can be achieved in particular by the depth of the depression being sufficient to ensure that the area of the tensioning band lying directly under the tensioning elements does not touch the bottom of the recess. Since the contact force is reduced in the area of the depression, the force is distributed more evenly over other areas of the belt and a concentration of the force in the area of the tensioning elements can be avoided. Tests have shown that the contact force can be increased in areas of the tensioning belt that are remote from the tensioning elements. The redistribution of forces can be controlled by suitable selection of the depth or profile of the recess in the circumferential direction.

If the insert comprises a number of strip-like bearing surfaces running parallel to one another, each of these bearing surfaces may have a depression in the same axial region. In any case, the depression or, in the case of several strip-like bearing surfaces, the respective recesses should be sufficiently wide overall that the clamping elements do not project beyond the recess at their axial ends and rest thereon with a higher bearing force. The depression or depressions are intended to reduce the bearing force over the entire width of the tensioning elements.

In a particularly advantageous embodiment of the invention, it is proposed that the bearing surface has two depressions, each of which is provided below one of the clamping elements. However, embodiments of the invention are also conceivable in which a single depression extends over a sufficiently long circumferential area to cover both tensioning elements.

It is further proposed that the insert has at least one projection which engages in an opening in the tensioning band to fix the position of the insert relative to the tensioning band in the circumferential direction.

If the opening in the tensioning band is provided on an inner leg of at least one of the loops, precise positioning can be ensured without weakening the band in areas where it is not doubled by the two legs of the loop.

In a further embodiment of the invention, it is proposed that the tensioning band has, at least in a circumferential region outside the loops, a profile with two ribs projecting radially inwards and a depression formed between the ribs. This means that the spring action of the W-profile can also be exerted by the tensioning band.

In a particularly advantageous embodiment of the invention, it is proposed that the insert includes an extension which has a reduced width compared with the rest of the insert has at at least one end and can be placed in the depression between the ribs of the tensioning band, the extension being offset radially outwards relative to the bearing surface. In this way, a transition at the end of the tensioning belt can be smoothed.

It is further proposed that the insert comprises radially projecting walls at both axial edges for receiving the tensioning band. This can ensure secure axial positioning of the tensioning band and protect the material to be clamped from damage.

Further features and advantages will be apparent from the following figure description. The entire description, the claims and the figures disclose features of the invention in specific embodiments and combinations. The person skilled in the art will also consider the features individually and combine them into further combinations or sub-combinations to adapt the invention, as defined in the claims, to his needs or to specific fields of application.

In this regard, the following is shown:

FIG. 1 shows a tensioning clamp according to a first embodiment of the invention in a perspective view.

Figure 1:
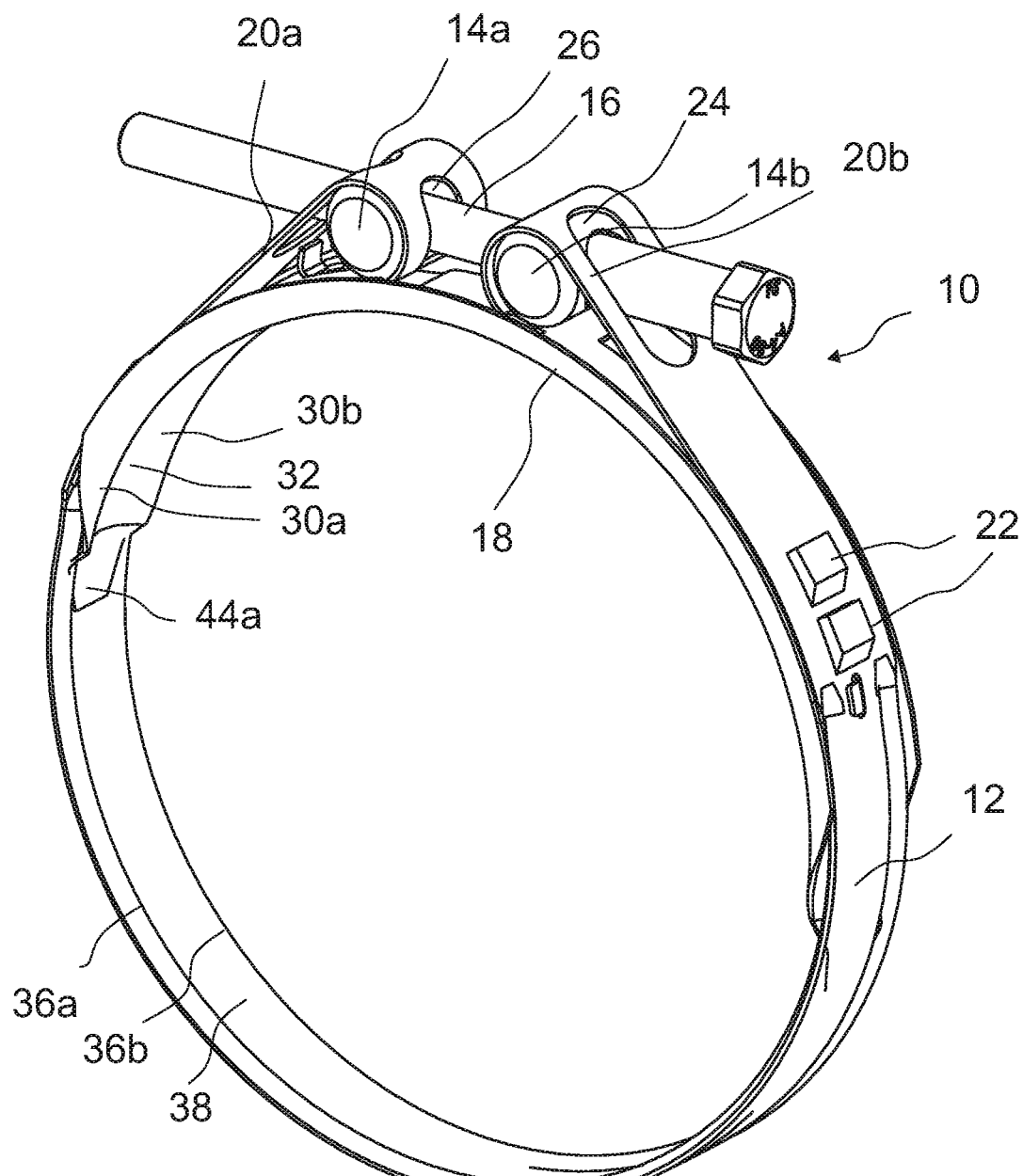
FIG. 1 illustrates a tension clamp according to a first embodiment of the invention in a perspective view.

The tensioning clamp 10 comprises a tensioning band 12, two tensioning elements 14a, 14b, a pulling element 16 in the form of a tension screw, and an insert.

Two ends of the tensioning band 12 are each folded over to form a loop, wherein legs of the loops 20a, 20b are folded over inwardly. The outer leg of each of the loops 20a, 20b includes press cuts 22 or openings, into which fastening tabs or hooks 23 (FIG. 2) cut free from the inner leg of the loops 20a, 20b of the tensioning band 12 engage.

Each of the loops 20a, 20b receives one of the tensioning elements 14a, 14b and has a punched opening 24, 26 on its end face in the circumferential direction and in the outer leg. The tensioning screw 16 connects the tensioning elements 14a, 14b through the openings of the loops 20a, 20b and transmits a tensile force applied for tensioning the tensioning clamp 10 and thus pulls the tensioning elements 14a, 14b towards each other so that the circumference of the tensioning clamp 10 is reduced and a radially acting contact force is exerted on the tying material (not shown).

The insert 18 of the tensioning clamp 10 is made of a steel sheet and is arranged in particular in the circumferential region of the loops 20a, 20b between the tensioning band 12 and the material to be clamped, so that the loops 20a, 20b rest on the insert 18 and do not come into direct contact with the material to be clamped. In the embodiment shown in FIG. 1, the length of the insert 18 extends over half the circumference of the clamp 10.

The insert 18 has a profile with two radially inwardly projecting ribs 30a, 30b running in the circumferential direction of the tensioning clamp 10 and a depression 32 formed between the ribs 30a, 30b, i.e. a W-profile. The rear side of the depression 32 facing the tensioning band 12 forms a bearing support 34 for the tensioning band 12. The spring action of the W-profile ensures a high degree of tightness over a very wide temperature range.

Like the insert 18, the tensioning band 12 also has a profile in a circumferential region not covered by the insert 18, with two ribs 36a, 36b projecting radially inwards and a depression 38 formed between the ribs 36a, 36b.

Figure 2:
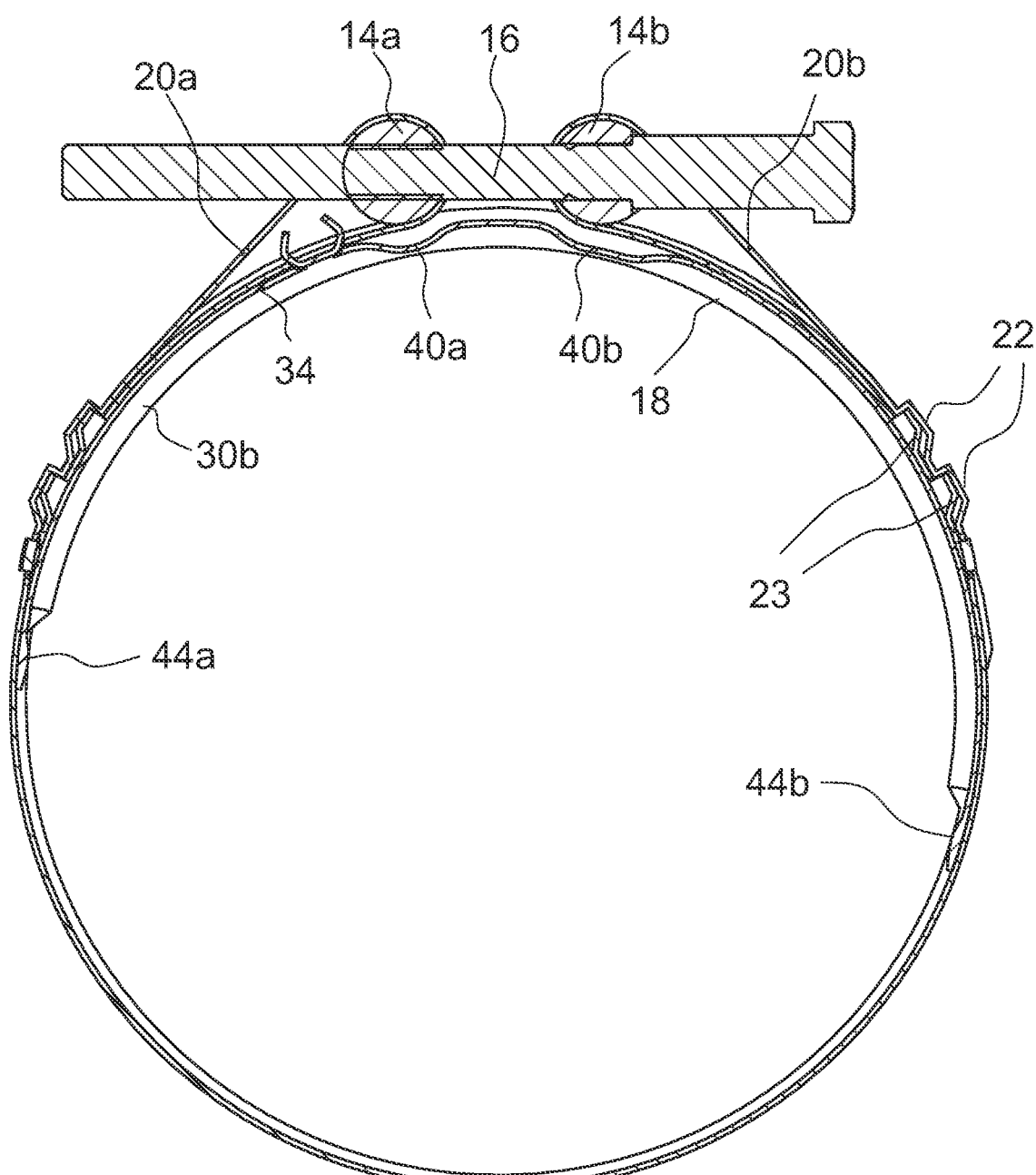
FIG. 2 shows the clamp from FIG. 1 in a radial section.
Figure 3:
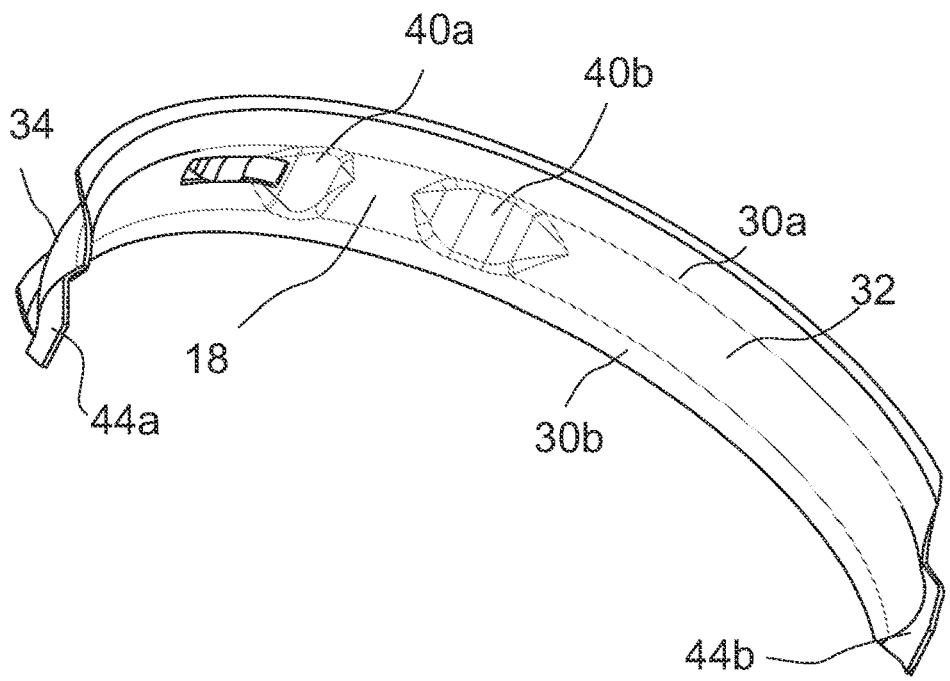
FIG. 3 illustrates an insert of the tension clamp from FIGS. 1 and 2 in a view from the radially inner side.
Figure 4:
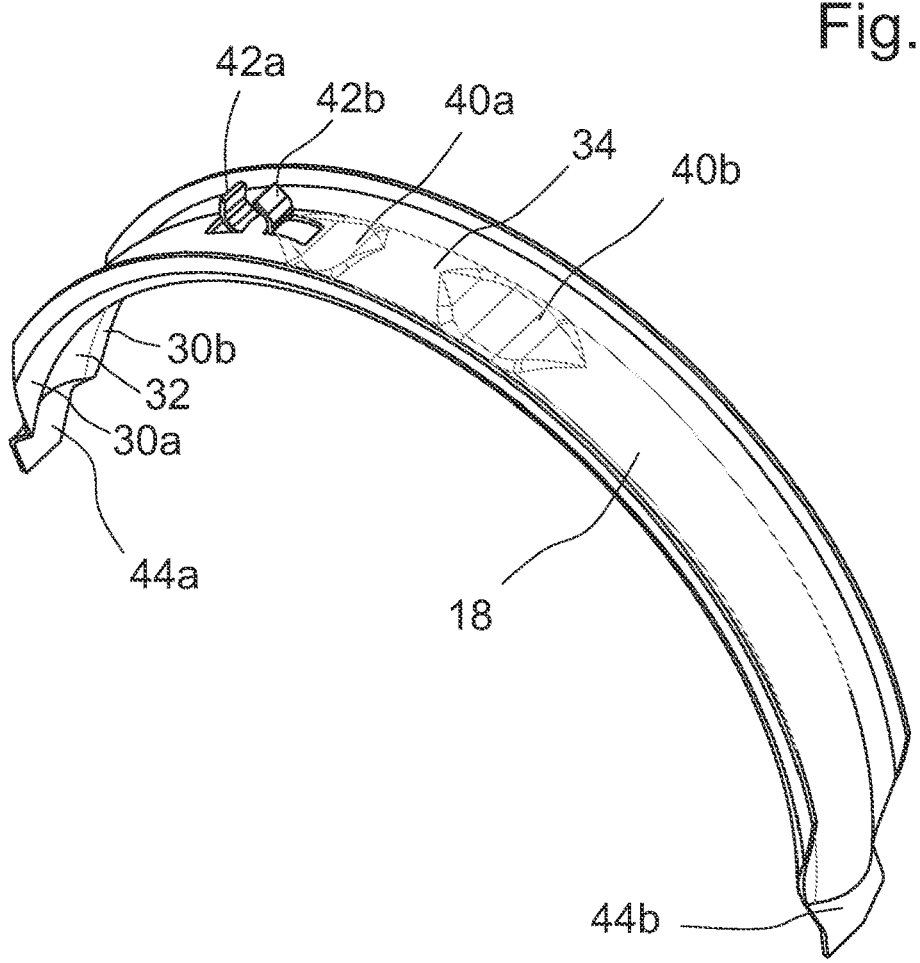
FIG. 4 illustrates the insert from FIG. 3 in a view from the radially outer side.

FIG. 2 shows the tensioning clamp 10 of FIG. 1 in a radial section, FIG. 3 shows the insert 18 of the tensioning clamp 10 of FIGS. 1 and 2 in a view from the radially inner side, and FIG. 4 shows the insert 18 of FIG. 3 in a view from the radially outer side.

The support surface 34 has two depressions 40a, 40b which, in the assembled state of the insert 18, are arranged in a circumferential region lying below the clamping elements 14a, 14b. The depth of the depressions 40a, 40b is sufficient to ensure that the area of the tensioning band 12 lying immediately below the tensioning elements 14a, 14b does not touch the bottom of the depressions 40a, 40b (FIG. 2) and that the force is distributed more evenly over other areas of the tensioning band 12.

Since the insert 18 is made of sheet steel, as shown in FIG. 3, the depressions 40a, 40b in the radially outer bearing surface 34 can be seen as dents on the radially inner side of the insert 18 facing the material to be clamped.

The insert 18 has two projections 42a, 42b which are provided as free-cut tabs. The projections 42a, 42b form latching springs which engage in an opening in the tensioning band 12. The insert 18 can thus be engaged with the opening in the tensioning band 12. This can enable transport securing and the position of the insert 18 can be fixed in relation to the tensioning band 12 in the circumferential direction. The opening in the tensioning band 12 is formed on an inner leg of one of the loops 20a, 20b.

The insert 18 has an extension 44a, 44b at both ends which has a reduced width relative to the remainder of the insert 18 and can be placed in the depression 38 between the ribs 36a, 36b of the tensioning band 12. The extension 44a, 44b is offset radially outwardly relative to the bearing surface 34 so that when the tensioning clamp 10 is tightened, the free end of the insert 18 is guided circumferentially in the depression 38 of the tensioning clamp 10.

The invention claimed is:

1. A tensioning clamp, comprising:
   a tensioning band (12), two tensioning elements (14a, 14b), a pulling element (16) and an insert (18), wherein the tensioning band (12) comprises two ends which are each folded over to form a loop (20a, 20b), wherein each of the loops (20a, 20b) receives one of the tensioning elements (14a, 14b) and has openings, the pulling element (16) connects the tensioning elements (14a, 14b) through the openings of the loops (20a, 20b), the pulling element (16) transmits a pulling force applied for tensioning the tensioning clamp (10) and pulls the tensioning elements (14a, 14b) towards each other, the insert (18) is arranged in a circumferential region of the loops (20a, 20b) between the tensioning band (12) and a material to be clamped, and the insert (18) has a profile with at least two radially inwardly projecting ribs (30a, 30b) running in the circumferential direction of the tensioning clamp (10) and a depression (32) formed between the ribs (30a, 30b), the rear side of said depression (32) facing the tensioning band (12) forming a support surface (34) for the material to be clamped;
   wherein the support surface (34) has at least one depression (40a, 40b) limited to a circumferential region lying below the tensioning elements (14a, 14b; wherein the insert (18) has at least one projection (42a, 42b) which engages in an opening in the tensioning band (12) in order to fix the position of the insert (18) in relation to the tensioning band (12) in the circumferential direction, wherein the opening (12) in the tensioning band is provided on an inner leg of at least one of the loops (20a, 20b).

2. The tensioning clamp of claim 1, wherein the supporting surface (34) has two depressions (40a, 40b), each of which being provided below one of the clamping elements (14a, 14b).

3. The tensioning clamp of claim 1, wherein the tensioning band (12) has, at least in a circumferential region outside the loops (20*a*, 20*b*), a profile with two ribs (36*a*, 36*b*) projecting radially inwards and a depression (38) formed be-tween the ribs (36*a*, 36*b*).

4. The tensioning clamp of claim 3, wherein the insert (18) has at least at one end an extension (44*a*, 44*b*) which has a reduced width compared to the rest of the insert (18) and can be placed in the depression (38) between the ribs (36*a*, 36*b*) of the tensioning band (12).

5. The tensioning clamp of claim 4, wherein the extension (44*a*, 44*b*) is offset radially outwardly relative to the bearing surface (34).

6. The tensioning clamp of claim 1, wherein the insert (18) comprises radially projecting walls at both axial edges for receiving the tensioning band (12).

\* \* \* \* \*